(12) United States Patent
Ohno et al.

(10) Patent No.: US 6,447,564 B1
(45) Date of Patent: *Sep. 10, 2002

(54) REGENERATION SYSTEM FOR AN EXHAUST GAS CLEANING DEVICE

(75) Inventors: Kazushige Ohno; Teruo Komori; Takeshi Ninomiya; Noriyuki Taoka; Sungtae Hong, all of Gifu Pref. (JP)

(73) Assignee: Ibiden Co., Ltd., Ohgaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,537

(22) Filed: Sep. 22, 1999

(30) Foreign Application Priority Data

Sep. 30, 1998 (JP) ............................ 10-277375
Sep. 30, 1998 (JP) ............................ 10-277376
Sep. 16, 1999 (JP) ............................ 11-261930

(51) Int. Cl.[7] .............................................. B01D 46/00
(52) U.S. Cl. .................. 55/282.3; 55/523; 55/DIG. 10; 55/DIG. 30
(58) Field of Search ........................ 55/282.3, 523, 55/DIG. 10, DIG. 30; 60/311

(56) References Cited

U.S. PATENT DOCUMENTS

| | | | |
|---|---|---|---|
| 4,503,672 A | * | 3/1985 | Stark et al. ............ 55/DIG. 30 |
| 4,505,107 A | * | 3/1985 | Yamaguchi et al. ... 55/DIG. 10 |
| 4,512,786 A | * | 4/1985 | Sakurai et al. ......... 55/DIG. 30 |
| 4,531,363 A | * | 7/1985 | Ludecke et al. ........ 55/DIG. 30 |
| 4,655,037 A | | 4/1987 | Rao |
| 4,925,463 A | * | 5/1990 | Kuhnert ................... 55/DIG. 30 |
| 5,259,190 A | * | 11/1993 | Bagley et al. .......... 55/DIG. 30 |
| 5,720,787 A | * | 2/1998 | Kasai et al. ............ 55/DIG. 10 |
| 5,750,026 A | * | 5/1998 | Gadkaree et al. ....... 55/DIG. 10 |
| 6,102,976 A | * | 8/2000 | Oji et al. ................ 55/DIG. 10 |

FOREIGN PATENT DOCUMENTS

| | | |
|---|---|---|
| DE | 40 21 033 | 1/1992 |
| EP | 0 501 138 | 9/1992 |
| EP | 0 590 814 | 4/1994 |
| WO | WO 93/12206 | 6/1993 |
| WO | WO 97/28358 | 8/1997 |

* cited by examiner

*Primary Examiner*—Duane S. Smith
(74) *Attorney, Agent, or Firm*—Oliff & Berridge, PLC

(57) ABSTRACT

A regeneration system for an exhaust gas cleaning device disposed in an exhaust emission path of an internal combustion engine has an exhaust gas cleaning honeycomb filter and a heating element for the filter, wherein the filter is a checkered SiC honeycomb filter having a given cell structure, and the heating element is a heater or a glow plug when using a fuel containing fuel additive.

4 Claims, 15 Drawing Sheets

| Properties | Ceramic glow plug | Metal glow plug |
|---|---|---|
| Time reaching to 800°C by heating (sec) | 3.5seconds | 5.5seconds |
| Saturated temperature (°C) | 1100°C | 900°C |
| Power consumption per one plug (W) | 36W | 55W |
| Service life | not less than 200,000Km | about 100,000Km |

REGENERATION SYSTEM FOR AN EXHAUST GAS CLEANING DEVICE

BACKGROUND OF THE INVENTION

1. Field of the Invention

This invention relates to a regeneration system for an exhaust gas cleaning device, and more particularly to a regeneration system comprising an exhaust gas cleaning device disposed in an exhaust emission path of an internal combustion engine and provided with an exhaust gas cleaning honeycomb filter for catching particulates included in the exhaust gas and a heating means for the exhaust gas cleaning honeycomb filter when a fuel containing a fuel additive for mitigating particulates included in the exhaust gas is used as a fuel for the internal combustion engine.

2. Description of Related Art

In the internal combustion engine such as diesel engine or the like, particulates (e.g. soot or unburned portion of fuel) are included in the exhaust gas. Particularly, the discharge amount of particulates becomes large in a diesel engine using a gas oil as a fuel or a direct-injection type gasoline engine recently coming into wide use. Therefore, it is well-known to remove the particulates by an exhaust gas cleaning device disposed in an exhaust emission path of the internal combustion engine and provided with an exhaust gas cleaning honeycomb filter.

As the exhaust gas cleaning honeycomb filter is generally used a cordierite filter 32 of a honeycomb structure as shown by a diagrammatically section view in FIG. 1. In such a conventional cordierite filter 32 are included a plurality of exhaust gas flowing channels 33 extending in parallel to a longitudinal direction thereof, wherein these channels 33 are alternately plugged at either upstream side or downstream side for the exhaust gas of their ends with plugging members 33a to form a checker pattern.

As shown in FIG. 1, an exhaust gas Gin emitted from a diesel engine (not shown) flows into the cordierite filter 32 through the exhaust emission path 11, at where particulates included in the exhaust gas are filtered off on surfaces of cell walls constituting the exhaust gas flowing channels 33. Then, the cleaned exhaust gas Gout passed through cordierite filter 32 again passes through the exhaust emission path 11 and is discharged out to the outside of the vehicle.

It is known that pressure loss $\Delta P$ is produced when the exhaust gas Gin passes through the filter 32. The pressure loss $\Delta P$ is represented by the following equation (1).

$$\Delta P = \Delta P1 + \Delta P2 + \Delta P3 + \Delta P4 \tag{1}$$

wherein $\Delta P1$ is a resistance produced due to the narrowing of an opening portion in the exhaust gas flowing channel 33 when the exhaust gas flows into the channel 33 through the exhaust emission path 11;

$\Delta P2$ is a resistance produced in the flowing of the exhaust gas through the exhaust gas flowing channel 33;

$\Delta P3$ is a resistance produced in the passing through a wall of the exhaust gas flowing channel 33;

$\Delta P4$ is a resistance produced when the exhaust gas passes through particulates deposited on the surface of the exhaust gas flowing channel 33.

In this case, the resistances $\Delta P1$, $\Delta P2$, $\Delta P3$ are dependent upon a cell structure constituting the filter 32, respectively and are a constant value $\Delta Pi$ not depended upon the lapse of time coming into problem in the deposition of the particulates and the like (hereinafter "$\Delta P1 + \Delta P2 + \Delta P3$" is called as "initial pressure loss"). For this end, a greater part of the pressure loss $\Delta P$ is determined by the resistance $\Delta P4$ produced when the exhaust gas passes through the particulates deposited on the cell walls. The resistance $\Delta P4$ is usually 2–3 times the initial pressure loss $\Delta Pi$ at a deposited state of the particulates.

In FIG. 2 is shown a relation among cell structure, typical dimensions, geometrical surface area and opening ratio in the filter. The cell structure Cs (mil/cpi) is represented by thickness of cell wall dc (mil=milli inch) to cell number Nc per square inch (cpi=cells per square inch), and the geometrical surface area fs ($cm^2/cm^3$) is an area passing the exhaust gas per unit volume (filtering area). Moreover, the cell wall thickness dc is shown by unit of mm in FIG. 2.

As seen from FIG. 2, the pressure loss $\Delta P$ produced in the checkered honeycomb filter for cleaning the exhaust gas is small as the cell number Nc and geometrical surface area fs in the filter become large. And also, the opening ratio $\alpha$ (%) is a ratio of total opening area of the exhaust gas flowing channels occupied in the sectional area of the filter. As shown in FIG. 2, a limit not creating cracks (crack limit) is large as the opening ratio a becomes small.

On the other hand, a mechanical strength of the filter, i.e. bending strength S* of the filter is approximately equal to product of strength S of a filter made of porous material and relative density $\rho^*$ as mentioned below. When the nature of the porous material constituting the filter is represented by density $\rho$ and strength S, the bending strength S* of the filter and the relative density $\rho^*$ are as follows:

$$\rho^* = \alpha \times \rho \tag{2}$$

$$S^* \cong \rho^* \times S \tag{3}$$

That is, the strength is high as the opening ratio $\alpha$ becomes small.

Further, the regeneration of the filter is carried out by burning the particulates according to the following reaction equation (4):

so that the strength of the filter against the thermal stress becomes important. Particularly, when the filter is made from a ceramic material, brittle rupture is caused by thermal stress to create cracks. Such a cracking phenomenon is apt to be created as heat quantity produced in the regeneration or the amount of the particulates deposited to be burnt becomes large. Moreover, the unburned portion of fuel constituting the particulate is an organic compound, so that it is burned by heating the filter. As mentioned below, a crack limit preventing the occurrence of the cracking phenomenon is proportional to the opening ratio $\alpha$ and is closely related to the thickness dc of the cell wall as seen from FIG. 2. If the opening ratio $\alpha$ is same, as the thickness dc of the cell wall becomes thick, the crack limit is high.

Therefore, the exhaust gas cleaning filter having good properties is preferably made of a material having a large crack limit, an excellent strength against thermal stress and a small pressure loss.

Recently, fuel previously including a fuel additive, or a device dropwise adding a fuel additive to a fuel is developed for controlling the amount of the particulate produced in the exhaust gas and the use thereof is increasing. Such a fuel additive has an effect of preventing the formation of soot in the burning of the fuel.

However, the formation of the particulate can not completely be controlled even by using such a fuel additive and hence the particulate is formed in the exhaust gas. Therefore, it is indispensable to use the exhaust gas cleaning filter.

In the conventional technique, the cordierite filter is generally adopted as a checkered honeycomb filter for cleaning the exhaust gas as previously mentioned. However, there is a problem that the amount of the particulate to be treated in one regeneration of the cordierite filter has a limit because the maximum service temperature in the filter is low. In this case, a large pressure loss is caused in the filter due to the deposition of the particulate, so that the combustion efficiency of the internal combustion engine lowers to degrade the fuel consumption.

And also, there is proposed a technique for regenerating the exhaust gas cleaning device by burning the particulate caught on the cordierite filter through a heating means for the filter. However, when such a greater amount of the particulate caught on the filter is burnt out by the heating means at once, a large change of the pressure loss is caused in the burning of the particulate in accordance with the heat conduction efficiency of the heating means, which gives incompatible feeling to a driver.

In FIG. 3 are shown experimental data illustrating a relation among pressure loss $\Delta P$ (mmAq) and temperature T (°C.) and time t (min) in the conventional checkered honeycomb cordierite filter for cleaning the exhaust gas. In FIG. 3, symbol Po is a case of burning a fuel containing a fuel additive, wherein as the temperature T rises with the increase of engine revolution number (engine loading), the deposition of particulates begins to decrease on the border of a certain time. That is, the burning of the particulate is begun at a temperature of To=about 380° C. to conduct the regeneration of the filter.

On the other hand, symbol Pn is a case of burning a fuel containing no fuel additive, wherein the pressure loss $\Delta P$ in the filter continuously rises in proportion to the deposition of the particulate even when the temperature Tn rises with the increase of the engine revolution number (engine loading). As a result, the burning of the particulate at a temperature of Tn=about 380° C. is not carried out different from the case of burning the fuel containing the fuel additive. Moreover, the beginning temperature of burning the particulates in case of using the fuel containing no fuel additive is generally about 630° C.

In order to reduce the pressure loss produced in the cordierite filter, therefore, it is considered to finely set the cell structure Cs of the cordierite filter with reference to FIG. 2. For example, it is considered that the cell number Nc (cpi) is set to a large value, while the thickness dc of the cell wall is set to a small value.

In the conventional cordierite filter, however, there is a limit in the formation of the fine cell structure from a view point of the strength inherent to the cordierite. For example, it is possible to manufacture the cordierite honeycomb filter having the cell number Nc of more than 100 cpi, but when such a filter is used as a checkered honeycomb filter capable of efficiently burning the particulate, the cracking is caused in view of the crack limit of cordierite itself, so that the cell number Nc (cpi) can not be made more than 100 when the checkered honeycomb filter for cleaning the exhaust gas is made of cordierite.

In addition, if it is intended to burn the deposited particulates through only the temperature of the exhaust gas, there is caused an inconvenience that the honeycomb filter for cleaning the exhaust gas can not completely be regenerated because the exhaust gas may not rise to a temperature required for burning the particulate when the vehicle is frequently run on urban area at a low speed.

SUMMARY OF THE INVENTION

Under the above situations, it is an object of the invention to provide a regeneration system for an exhaust gas cleaning device disposed in an exhaust emission path of an internal combustion engine capable of controlling a change of pressure loss to a smaller value during the regeneration and conducting the complete regeneration of the filter even at a running state hardly raising the temperature of the exhaust gas by using an exhaust gas cleaning honeycomb filter made of a porous silicon carbide sintered body, which can be set to a fine cell structure and is high in the crack limit and excellent in the strength against thermal stress, together with a heating means for the filter when a fuel containing a fuel additive is used as a fuel for the internal combustion engine.

According to the invention, there is the provision of a regeneration system for an exhaust gas cleaning device disposed in an exhaust emission path of an internal combustion engine comprising an exhaust gas cleaning honeycomb filter for collecting particulates included in the exhaust gas and a heating means for the exhaust gas cleaning honeycomb filter, characterized in that said internal combustion engine uses a fuel containing a fuel additive, and said filter is a checkered honeycomb filter made of a porous silicon carbide sintered body and having a cell structure that a cell number per square inch is not less than 100 cells and a thickness of a cell wall is not more than 0.43 mm, and said heating means is selected from a heater and a glow plug.

In a preferable embodiment of the invention, the glow plug is a ceramic glow plug.

In another preferable embodiment of the invention, the filter has a total volume corresponding to ¼–2 times an engine swept volume of the internal combustion engine.

In the invention, the exhaust gas cleaning honeycomb filter is a checkered SiC honeycomb filter made of the porous silicon carbide sintered body, so that it is high in the crack limit and excellent in the strength against thermal stress as compared with those of the conventional cordierite filter and hence the durability of the filter is high. And also, the checkered SiC honeycomb filter has a cell structure that the cell number per square inch is not less than 100 cells and the thickness of the cell wall is not more than 0.43 mm (=17 mil), which can be made finer than that of the conventional cordierite filter, so that the pressure loss can be decreased as compared with that of the cordierite filter to improve the fuel consumption.

Furthermore, in the regeneration system according to the invention, the heater or the glow plug as the heating means for the exhaust gas cleaning filter is arranged ahead the filter in the exhaust gas cleaning device, so that even if the temperature of the exhaust gas is not raised to a level required for burning the particulate during the running of the vehicle on urban area at a low speed or the like, the particulate can be burned by heating the filter through such a heating means, and hence the regeneration of the filter can completely be attained.

In case of using the glow plug, the space in the exhaust gas cleaning device can be saved and power consumption can be decreased as compared with those in the use of the heater. As the glow plug, there are a metal glow plug and a ceramic glow plug. The use of the ceramic glow plug is favorable because the time reaching to a given temperature by heating is faster than that of the metal glow plug and a saturated temperature can be made higher. And also, the ceramic glow plug is small in the power consumption as compared with the metal glow plug and is high in the durability. Therefore, the more efficient regeneration of the filter can be attained by the use of the ceramic glow plug as compared with the use of the heater or the metal glow plug.

In the invention, the total volume of the exhaust gas cleaning filter is set to ¼–2 times the engine swept volume of the internal combustion engine because the total volume is dependent upon the engine swept volume. When the total volume of the filter is less than ¼ times the engine swept volume, the sufficient filtering area can not be ensured and the pressure loss becomes larger to bring about the remarkable degradation of the fuel consumption, while when it exceeds 2.0 times, it is difficult to arrange the exhaust gas cleaning device inclusive of the filter in the exhaust emission path but also the thermal capacity becomes larger to delay reaction to the temperature of the exhaust gas to thereby lose a chance of obtaining a regeneratable temperature of the filter for burning the particulate.

BRIEF DESCRIPTION OF THE DRAWINGS

The invention will be described with reference to the accompanying drawings, wherein:

FIG. 6b is a partial front view of the checkered honeycomb SiC filter shown in FIG. 6a;

FIG. 8 is a view showing a comparison in properties between the ceramic glow plug and the metal glow plug;

DESCRIPTION OF PREFERRED EMBODIMENTS

Figure 1:
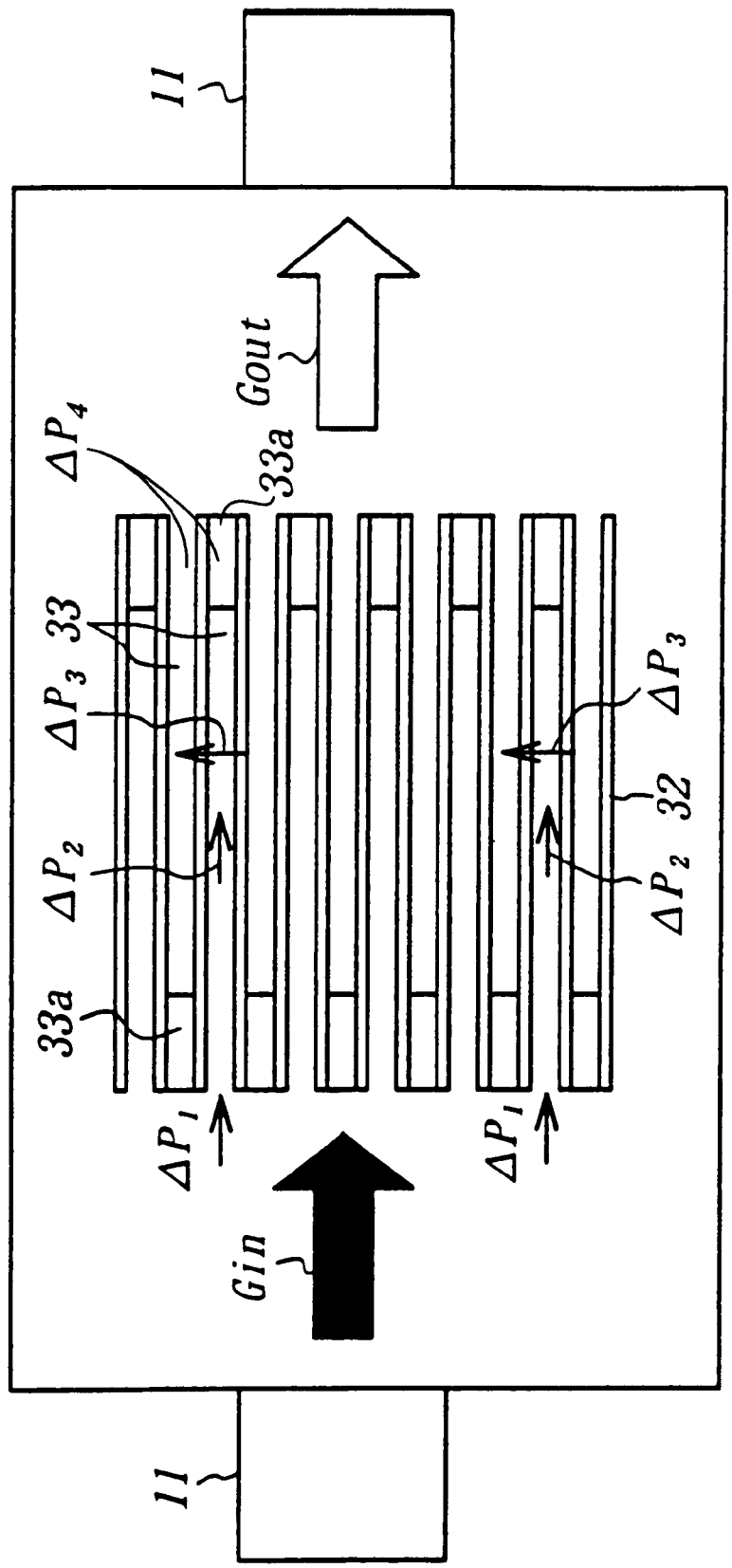
FIG. 1 is a diagrammatically section view illustrating the conventional checkered cordierite honeycomb filter for cleaning exhaust gas.
Figure 2:
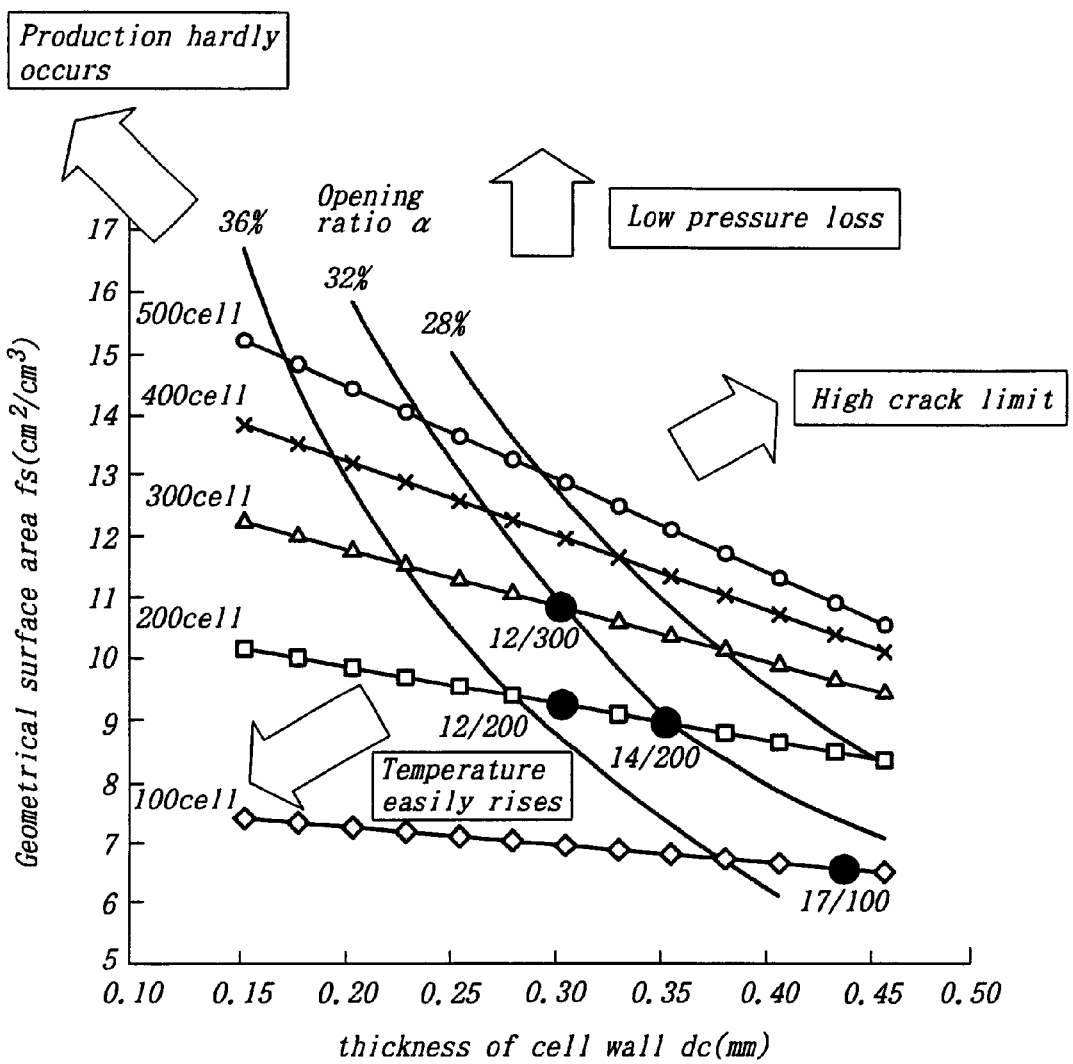
FIG. 2 is a graph showing a relation among cell structure, typical dimensions, geometrical surface area and opening ratio in the filter.
Figure 3:
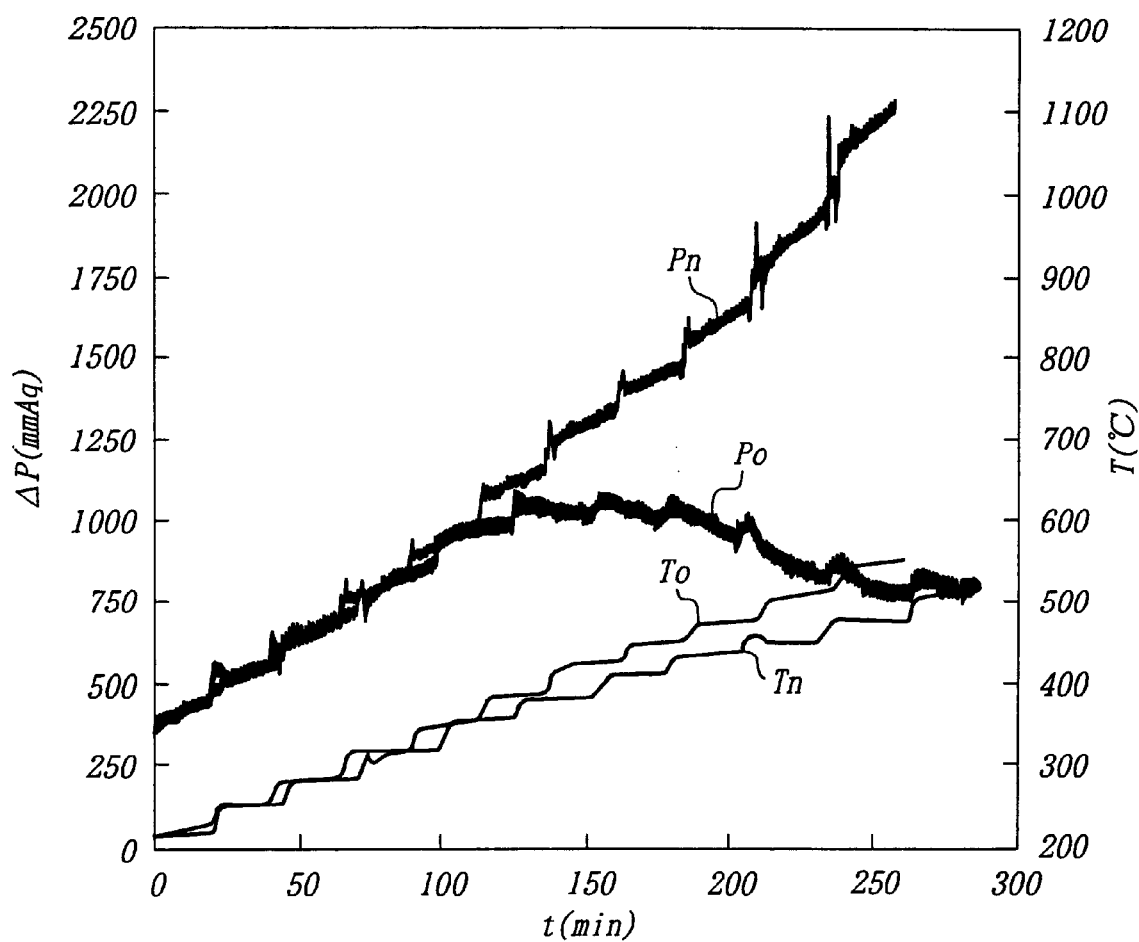
FIG. 3 is a graph showing a pressure loss produced when a checkered honeycomb filter for cleaning exhaust gas is made of cordierite in consideration with the presence or absence of a fuel additive as a function of temperature and time in the filter.
Figure 4:
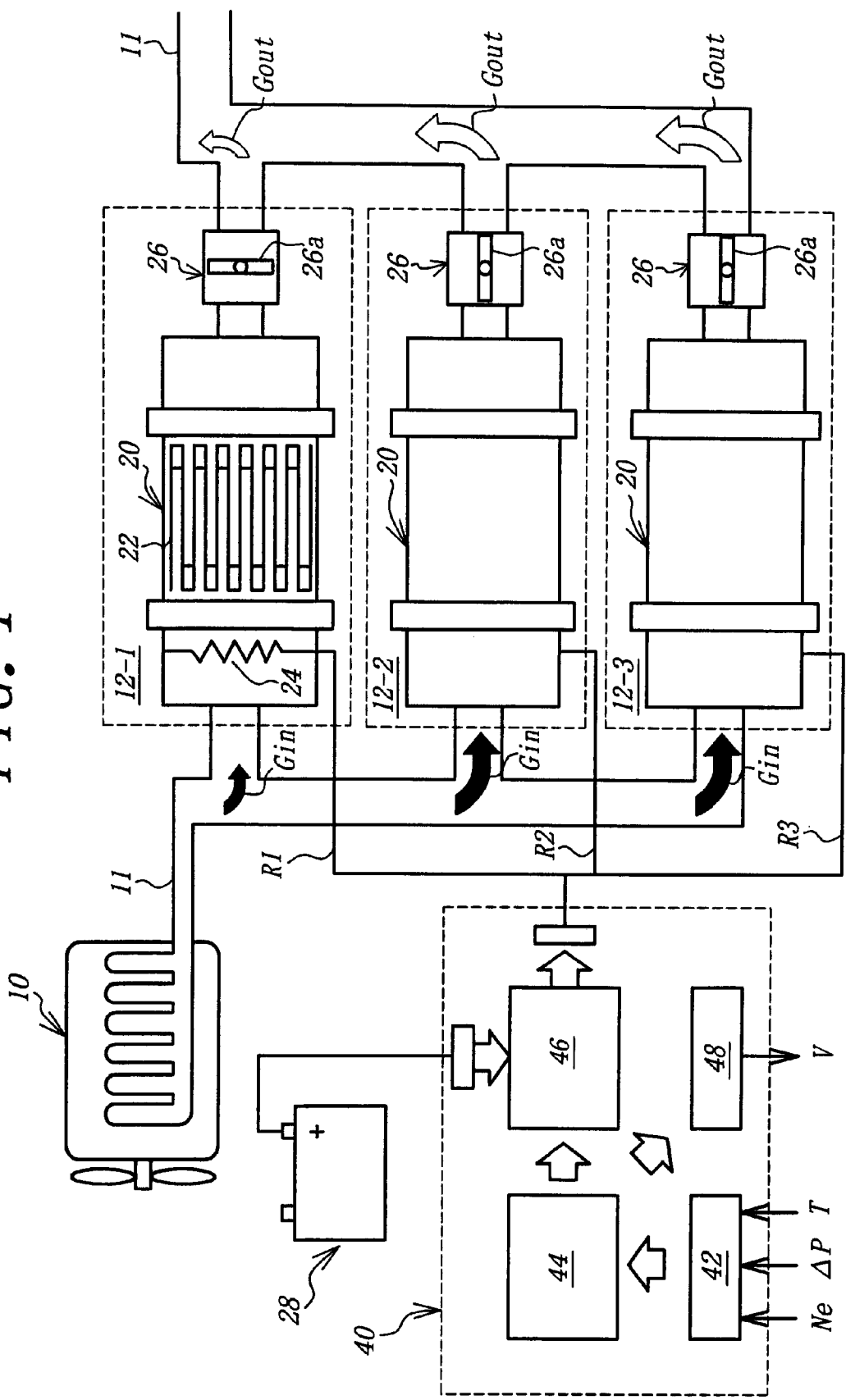
FIG. 4 is a block schematic diagram of a first embodiment of the regeneration system for the exhaust gas cleaning device according to the invention.

In FIG. 4 is shown a first embodiment of the regeneration system for the exhaust gas cleaning device for use in a diesel engine according to the invention. This system is a system for the regeneration of an exhaust gas cleaning device 20 cleaning the exhaust gas discharged from a diesel engine 10 using a gas oil containing a fuel additive, and comprises three regeneration units 12-1, 12-2, 12-3 disposed on a way of an exhaust emission path 11 from the engine 10 in a branched form. Each of these units comprises an exhaust gas cleaning device 20 provided with an exhaust gas cleaning filter 22 made of a porous silicon carbide (SiC) sintered body and carried with a catalyst for exhaust gas purification, a heating means 24 disposed ahead an end face of the SiC filter 22 at an upstream side thereof for heating the SiC filter 22, and a flow control valve 26 disposed at a downstream side of the SiC filter 22. Further, the regeneration system comprises a control unit 40 for controlling power supplied to the heating means 24 and the flow control valve 26. The control unit 40 is connected to a battery 28 mounted on a vehicle (not shown) and controls the heating means 24 and the flow control valve 26 independently.

The control unit 40 comprises an input part 42 inputted with measured values of engine revolution number Ne (rpm) and pressure loss ΔP (mmAq) and temperature T in an exhaust gas cleaning device 20, CPU (central processing unit) 44 processing output signals from the input part 42 for controlling actions of the heating means 24 and the flow control valve 26, a heater controlling unit 46 operating the heating means 24 based on the processed result in CPU 44, and an output part 48 operating the flow control valve 26 to a throttle position (see a position of a valve body 26a in the regeneration unit 12-1 of FIG. 4).

Figure 5:
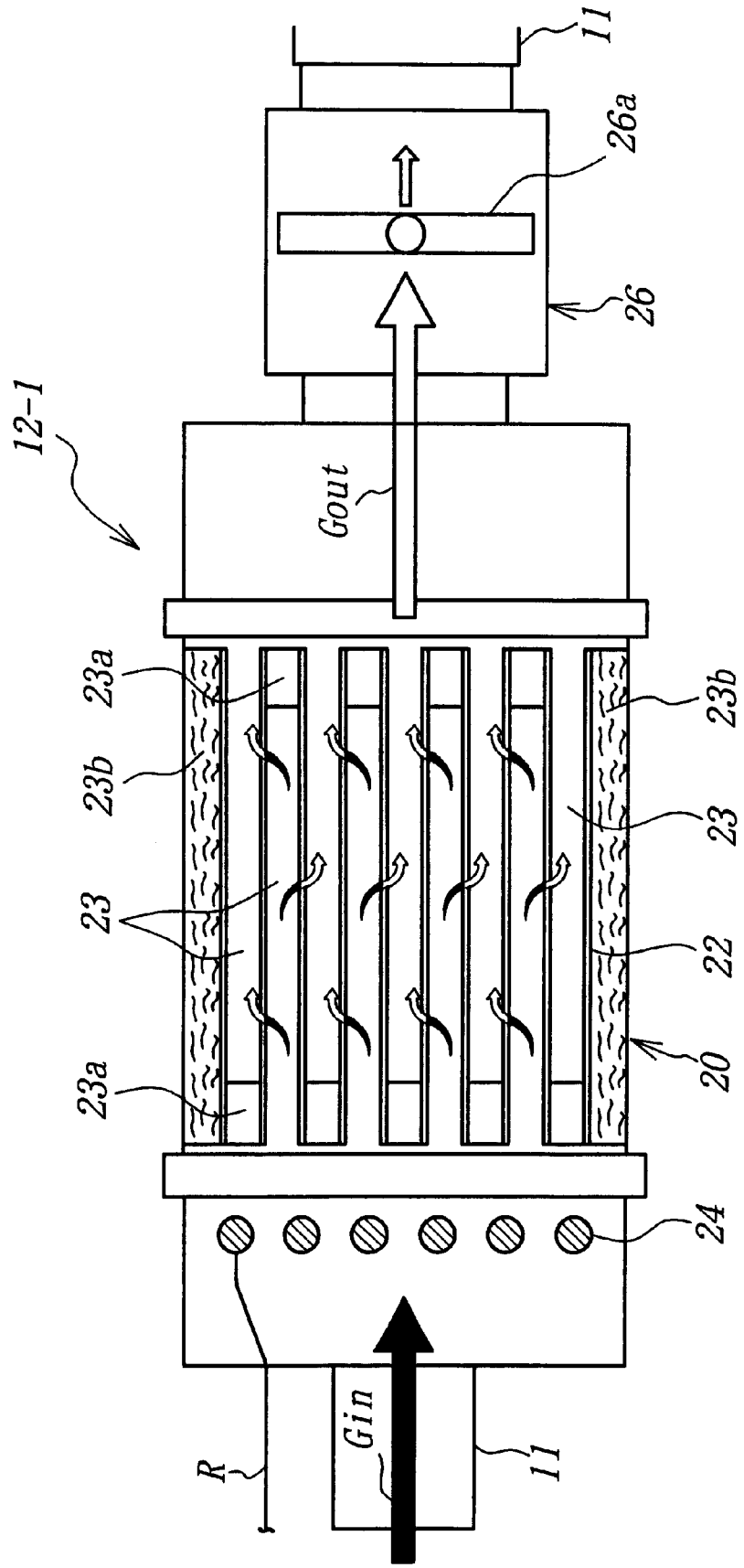
FIG. 5 is a diagrammatically section view of a main part in the regeneration system according to the invention shown in FIG. 4.

As shown in FIG. 5, the heating means 24 is a spiral-shaped resistance heating heater disposed apart from the upstream end face of the SiC filter 22 at a given distance. The heater is not restricted to the above spiral form and may take any forms as long as the exhaust gas from the engine 10 is passed in the arrangement ahead the SiC filter 22. Moreover, the kind of the heater is not particularly restricted, but a sheathed heater and the like may be used.

Figure 6A:
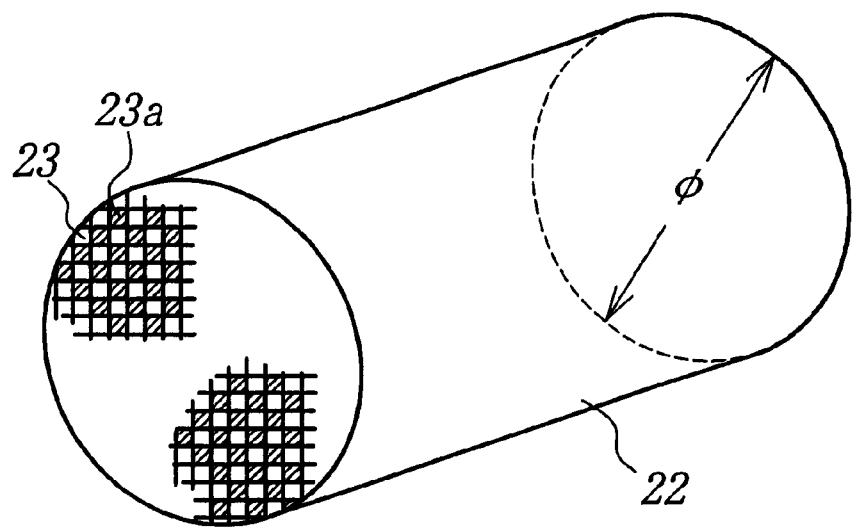
FIG. 6a is a perspective view of a checkered honeycomb SiC filter for cleaning an exhaust gas according to the invention.
Figure 6B:
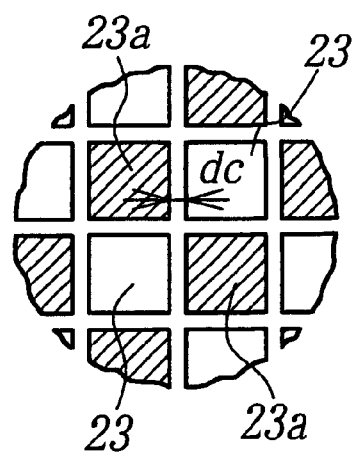

The honeycomb filter 22 for cleaning the exhaust gas will be described in detail below. In FIG. 5 is diagrammatically shown a first regeneration unit 12-1 among the three regeneration units 12-1, 12-2 and 12-3 in the exhaust gas cleaning device. As shown in FIG. 5, the honeycomb filter 22 for cleaning the exhaust gas is made of a porous silicon carbide (SiC) sintered body of a honeycomb structure. In such a SiC honeycomb filter 22 are formed a plurality of exhaust gas flowing channels 23 extending in parallel to a longitudinal direction thereof, wherein these channels 23 are alternately plugged at either inlet side or outlet side for the exhaust gas of their ends with plugging members 23a to form a checker pattern. That is, the exhaust gas cleaning honeycomb filter 22 made of the porous silicon carbide sintered body is a checkered SiC honeycomb filter having a given cell wall thickness dc at the upstream and downstream end faces thereof (see FIG. 6).

When using a fuel containing a fuel additive, harmful components included in the exhaust gas is decreased but are not completely removed as previously mentioned. Therefore, it is favorable to carry a catalyst for the purification of the exhaust gas on an inner wall surface of the exhaust gas flowing channel 23 for removing these harmful components. As the catalyst for the purification of the exhaust gas, use may be made of the conventionally known catalysts. Moreover, the checkered SiC honeycomb filter 22 is closely held in a casing of the exhaust gas cleaning device 20 through a heat insulating material 23b arranged on the outer periphery of the filter.

The checkered SiC honeycomb filter according to the invention is made of the porous silicon carbide sintered body so as to have a cell structure that the cell number Nc per square inch is not less than 100 cells and a cell wall thickness dc is not more than 0.43 mm (=17 mil). As a numerical value of a more preferable cell structure Cs (mil/cpi), there are concretely mentioned Cs=14/200, 12/200, 12/300 and the like.

Figure 7A:
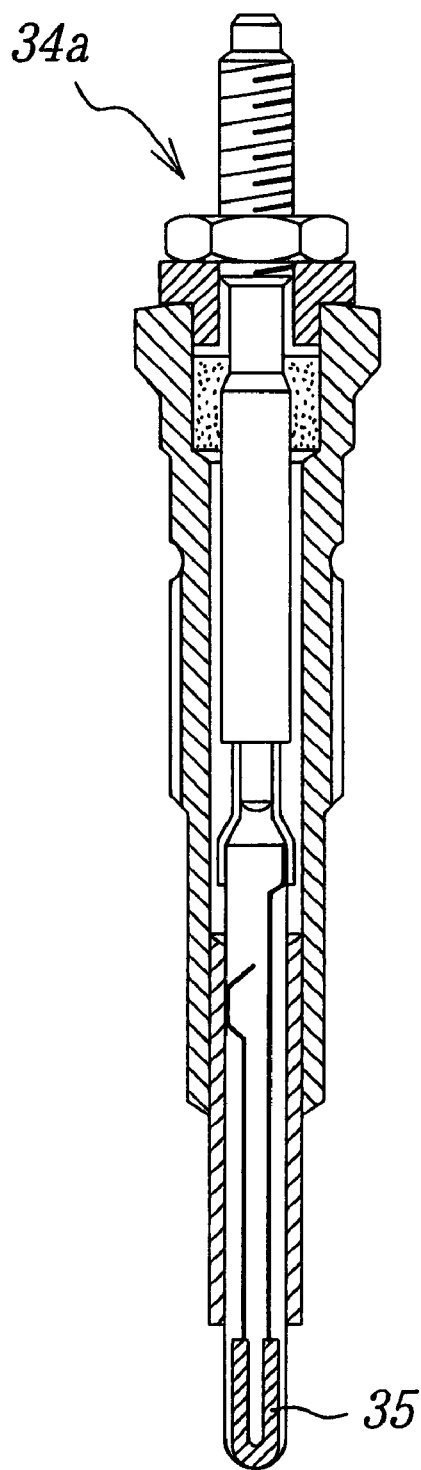
FIG. 7a is a diagrammatic view partly shown in section of a ceramic glow plug used as a heating means.
Figure 7B:
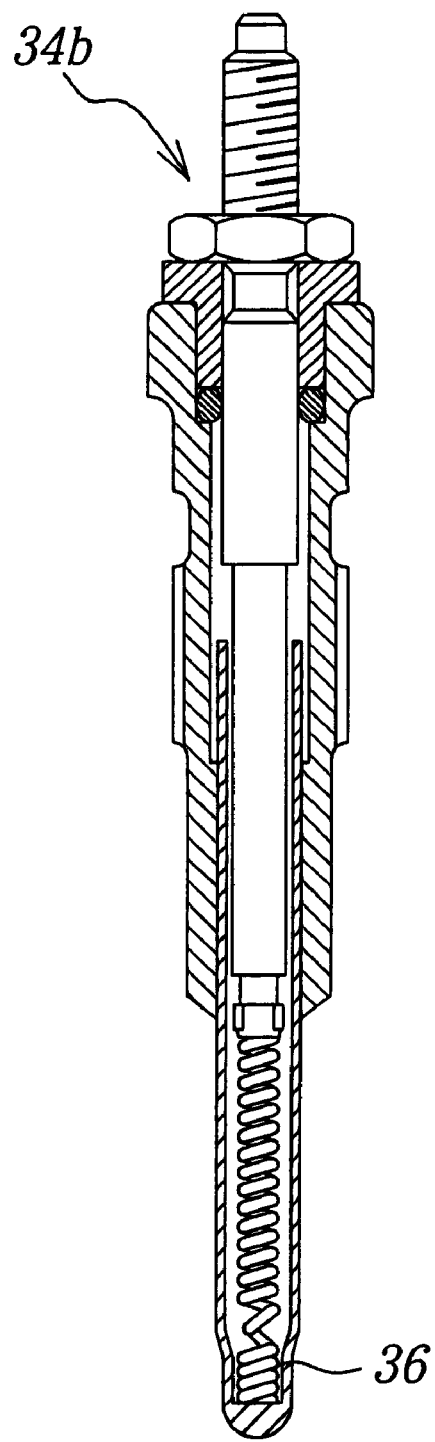
FIG. 7b is a diagrammatic view partly shown in section of a metal glow plug used as a heating means.

A second embodiment of the regeneration system for the exhaust gas cleaning device for use in a diesel engine according to the invention has the same structure as in the first embodiment except that a glow plug 34 is used instead of the heater as the heating means 24 as shown in FIG. 7. As the glow plug 34, there are two plugs as shown in FIGS. 7a and 7b. The plug shown in FIG. 7a is a ceramic glow plug 34a using an electrically conductive ceramic 35 attached to a top of the plug as a heating portion, wherein heat is generated by flowing current through the electrically conductive ceramic 35. The plug shown in FIG. 7b is a metal glow plug 34b using a heating coil 36 attached to the top of the plug as a heating part, wherein heat is generated by flowing current through the heating coil 36.

In FIG. 8 is shown a comparison in properties between the ceramic glow plug 34a and the metal glow plug 34b. In this case, the time reaching to 800° C. by heating is a surface temperature rising rate of the heating portion at the top of the plug, and the saturated temperature is a temperature when the surface temperature of the glow plug arrives at a saturated state or a temperature capable of conducting the burning at a stable state.

As seen from FIG. 8, the time reaching to 800° C. by heating is 3.5 seconds in the ceramic glow plug 34a and 5.5 seconds in the metal glow plug 34b. On the other hand, the saturated temperature is 1100° C. in the ceramic glow plug 34a, while that in the metal glow plug 34b is as low as 900° C. And also, the power consumption per one plug is 36 W in the ceramic glow plug 34a, while that in the metal glow plug 34b is required to be 55 W. Further, service life of the ceramic glow plug 34a converted to a running distance is not less than 200,000 km, while that of the metal glow plug 34b is about 100,000 km.

Therefore, when the ceramic glow plug 34a is compared with the metal glow plug 34b, it is effective to use the ceramic glow plug 34a as a glow plug used as a heating means for the filter.

The action of the regeneration system according to the invention will be described with reference to FIGS. 4 and 5 below. Although the action is described by using the ceramic glow plug 34b as the heating means 24, the similar action and effect are obtained even when the heater or the metal glow plug is used as the heating means 24.

When the exhaust gas Gin emitted from the diesel engine using a gas oil containing a fuel additive is flowed into the checkered SiC honeycomb filter 22 at a state of mitigating the amount of particulate in the exhaust gas owing to the use of the fuel additive, the particulate included in the exhaust gas is filtered off on the surfaces of the exhaust gas flowing channels 23. Thus, the exhaust gas Gout cleaned through the checkered honeycomb SiC filter 22 is again flowed into the exhaust emission path 11 and discharged out therefrom to the outside of the vehicle.

When the diesel engine is worked over a long time, the particulate included in the exhaust gas is gradually deposited on the inner wall surfaces of the channels 23. Therefore, it is required to regenerate the exhaust gas cleaning device by heating the honeycomb SiC filter every a given time during the working of the diesel engine.

During the running of the vehicle, the flow control valve 26 in each of the three regeneration units 12-1, 12-2, 12-3 is at a non-worked state, so that when the exhaust gas Gin is passed through the exhaust gas cleaning device 22, the particulate included in the exhaust gas Gin is filtered off by the SiC honeycomb filter 22 and gradually deposited on the inner wall surfaces of the channels 23 in the filter 22.

When a given amount of the particulate is caught on the inner wall surface of the channel 23, it is difficult to pass the exhaust gas Gin through the channel 23, so that the temperature inside the exhaust gas cleaning device 22 rapidly rises. When the temperature inside the cleaning device reaches to a given value with such a temperature rise, the particulate is burnt out by reacting with oxygen included in the exhaust gas Gin. In the running on urban area and the like frequently using low-speed running, however, there is a case that the temperature of the exhaust gas is not raised to a level required for burning the particulate.

In the regeneration system according to the invention, when the particulate is caught on the surface of the channel over a certain time, for example, only the regeneration unit 12-1 among the three regeneration units 12-1, 12-2, 12-3 is worked, while the other regeneration units 12-2, 12-3 are maintained at the non-worked state. That is, the ceramic glow plug 34a in the regeneration unit 12-1 is switched-on through a circuit R1 by a command from the control unit 40 to heat the end face of the SiC honeycomb filter 22 at the upstream side thereof, while the valve body 26a of the flow control valve 26 is also worked by a signal V from the output part 48 to throttle a flow of the exhaust gas passing through the SiC honeycomb filter 22 at a downstream side of the filter. In the regeneration unit 12-1, therefore, the exhaust gas Gin heated by the ceramic glow plug 34a gently passes through the SiC honeycomb filter 22, during which the particulates caught in the SiC honeycomb filter 22 are burnt out by reacting with oxygen included in the exhaust gas.

While the SiC honeycomb filter 22 in the regeneration unit 12-1 is regenerated by controlling only the ceramic glow plug 34a and the flow control valve 26 through the control unit 40, the exhaust gas is cleaned by the other remaining regeneration units 12-2 and 12-3.

After the completion of the regeneration in the regeneration unit 12-1, the other remaining regeneration units 12-2 and 12-3 are successively regenerated in the same manner as described above through the command from the control unit 40. Therefore, the regeneration units 12-1, 12-2, 12-3 are separately and successively regenerated during the running of the vehicle, which is fairly economical as compared with the case of regenerating these regeneration units after the running of the vehicle is stopped.

The effect by the provision of an oxidation catalyst on the inner wall surface of the exhaust gas flowing channel 23 in the SiC honeycomb filter 22 will be described in detail below.

In FIG. 9 is a chart illustrating a time period until a given pressure loss is caused by the presence or absence of the oxidation catalyst as a catalyst for the purification of the exhaust gas in the exhaust gas cleaning device.

Figure 9A:
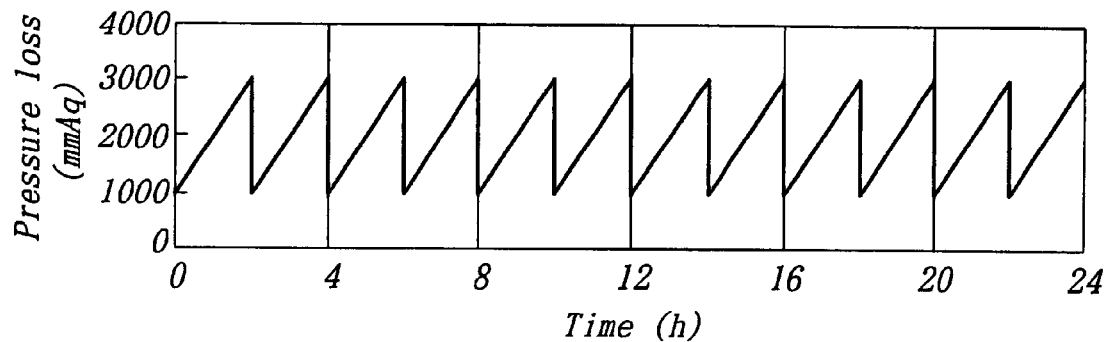
FIGS. 9a–9c are charts illustrating time periods until a given pressure loss is caused by the presence or absence of an exhaust gas purification catalyst for an exhaust gas cleaning device.
Figure 9B:
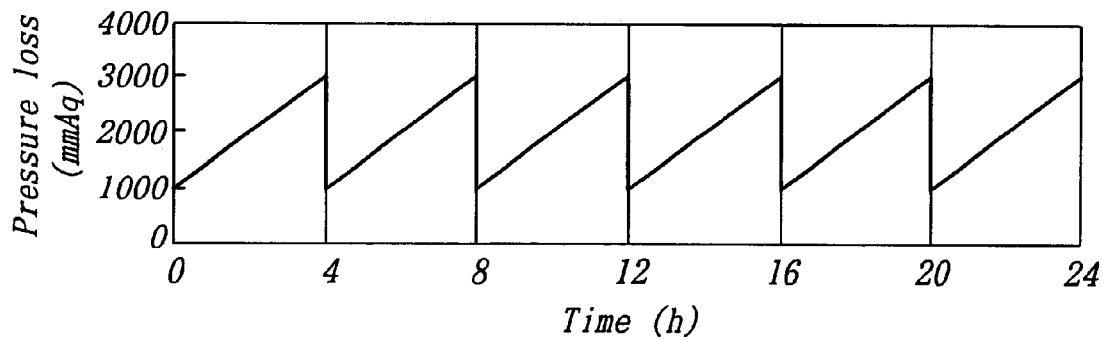
Figure 9C:
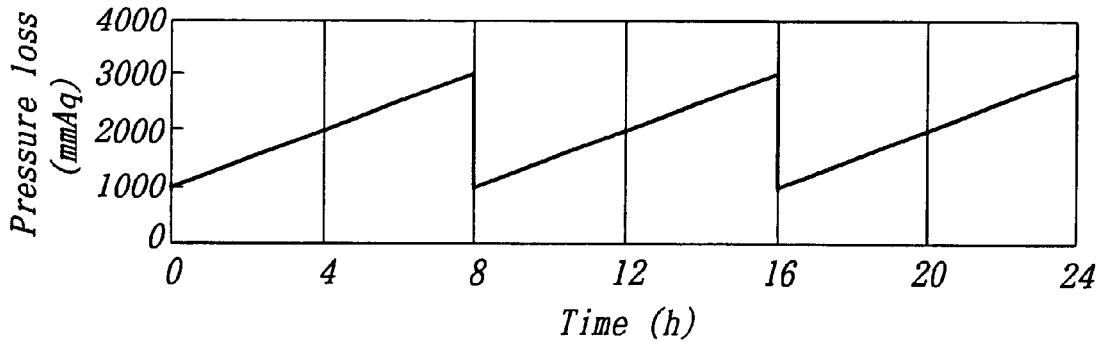

FIG. 9a shows a case that a diesel bus provided with an exhaust gas cleaning device using no oxidation catalyst is run on urban area at a usual low-speed, wherein a regeneration period of the SiC honeycomb filter 22 at a pressure loss of 3000 mmAq produced when 40 g of particulates are caught as a measure of beginning the regeneration is 2 hours. On the contrary, FIGS. 9b and 9c show a case of using an exhaust gas cleaning device with an oxidation 5 catalyst, respectively, wherein the regeneration period based on the pressure loss of 3000 mmAq is 4 hours in the low-speed running on urban area or the like as shown in FIG. 9b and 8 hours in the high-speed running on suburbs and expressways as shown in FIG. 9c.

As seen from these charts, when the oxidation catalyst is carried on the inner wall surface of the exhaust gas flowing channel 23 in the SiC honeycomb filter 22, the operation period for the regeneration system can be delayed during the running of the vehicle, which is effective to improve the durabilities of the ceramic glow plug 34a and the flow control valve 26. Moreover, the running mode of the vehicle is usually a mixed mode of low-speed running and high-speed running, so that the operation of the regeneration system is desirable to be begun every 3–4 hours as seen from FIGS. 9b and 9c.

Figure 10:
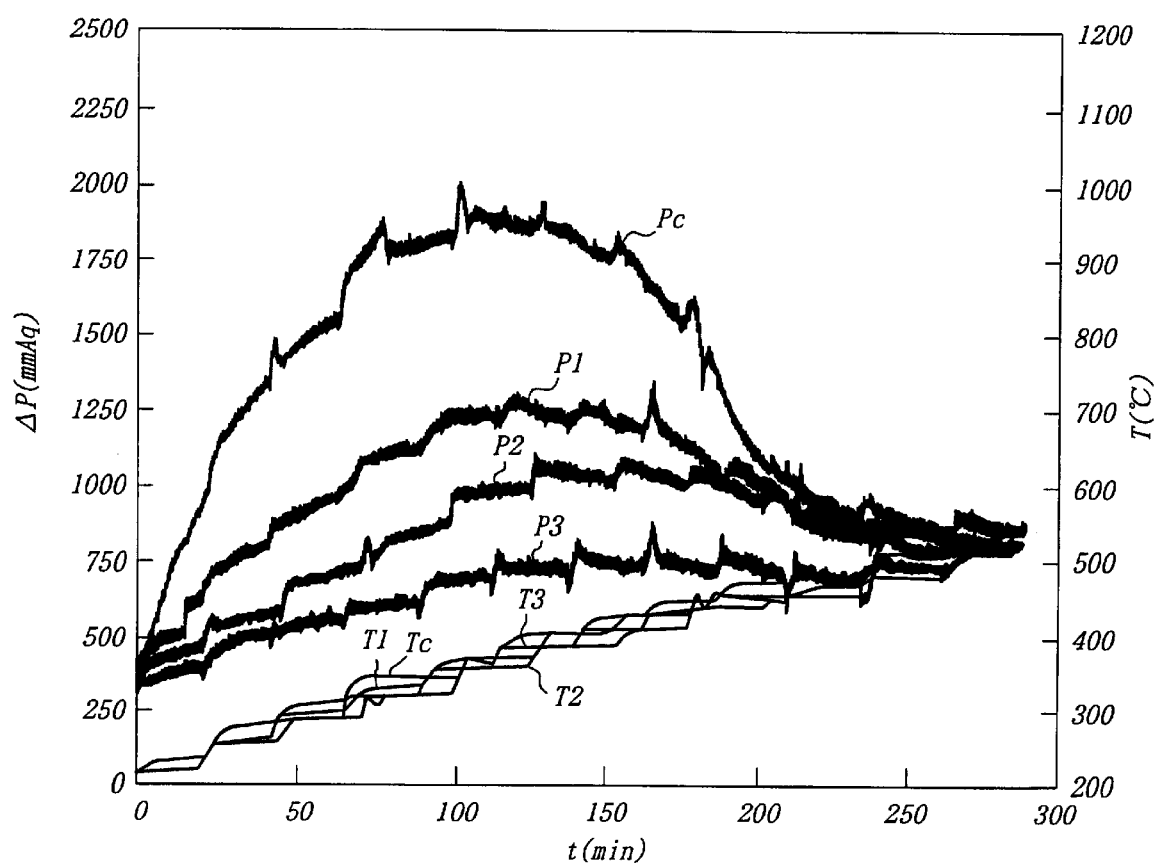
FIG. 10 is a graph showing a comparison in pressure loss between a checkered SiC honeycomb filter and a checkered cordierite honeycomb filter when using a gas oil containing a fuel additive.

In FIG. 10 is shown a comparison between the conventional checkered honeycomb cordierite filter and the checkered SiC honeycomb filter according to the invention illustrating a change of pressure loss $\Delta P$ with the lapse of time when a gas oil containing a fuel additive is used while gradually raising a temperature T of the exhaust gas. In this case, a curve Pc shows a change of pressure loss in the conventional checkered cordierite honeycomb filter having a cell structure Cs (mil/cpi) of 17/100, and curves P1, P2 and P3 show a change of pressure loss in the checkered SiC honeycomb filter according to the invention having cell structures Cs (mil/cpi) of 17/100, 14/200 and 12/300, respectively.

At first, the conventional cordierite filter is compared with the SiC filter at the same cell structure. In the conventional cordierite filter, when the particulate included in the exhaust gas is caught to a given amount by the filter, the change of pressure loss by the collection of particulates included in the exhaust gas Gin becomes equilibrium at an exhaust gas temperature Tc of about 380° C. or at a pressure loss $\Delta P$ of not less than 1750 mmAq as shown by the curve Pc in FIG. 10. After the lapse of a given time at the equilibrium state, the particulate is burnt by raising the exhaust gas temperature Tc to a given level, whereby the pressure loss is largely reduced. Such a large change of pressure loss Pc brings about the bad feeling in the running of the vehicle. Particularly, when the exhaust gas temperature is raised by pressing down an accelerator toward a floor, rapid burning of the particulate and rapid reduction of pressure loss are simultaneously caused to increase the engine revolution number to an unexpected level of a driver.

In the checkered SiC honeycomb filter according to the invention having the same cell structure as in the cordierite filter, when the particulate is caught by the filter to the same amount as in the cordierite filter, the change of pressure loss becomes equilibrium at an exhaust gas temperature T1 of about 380° C. or at a pressure loss $\Delta P$ of 1250 mmAq as shown by the curve P1 in FIG. 10. Even when the particulate is burnt by raising the exhaust gas temperature T1 to a given level in the same manner as in the cordierite filter, the change of pressure loss is small, which brings about comfortable feeling in the running of the vehicle.

Then, when the cell structure of the SiC filter is changed from 17/100 to 14/200 or 12/300, the change of pressure loss when the same amount of the particulate is caught becomes equilibrium at a pressure loss $\Delta P$ of about 950 mmAq or about 700 mmAq, respectively, at the exhaust gas temperature T of about 380° C. That is, as the thickness of the cell wall becomes thin and the cell number becomes large, the value of the equilibrium pressure loss becomes low and hence the change of pressure loss becomes small.

As seen from FIG. 10, the amount of the particulate caught when the change of pressure loss is at the equilibrium state is the same in any one of the above filters and the value of the equilibrium pressure loss becomes low as the cell structure of the filter becomes fine. And also, when the particulate is burnt by raising the exhaust gas temperature, the pressure loss returns to substantially the same level in the same treating time in all of these filters. Furthermore, as the level of pressure loss becomes lower, the change of pressure loss is small. From these facts, it can be seen that it is favorable to use a filter having a lower level of pressure loss as a honeycomb filter for cleaning the exhaust gas for improving the fuel consumption.

Figure 11:
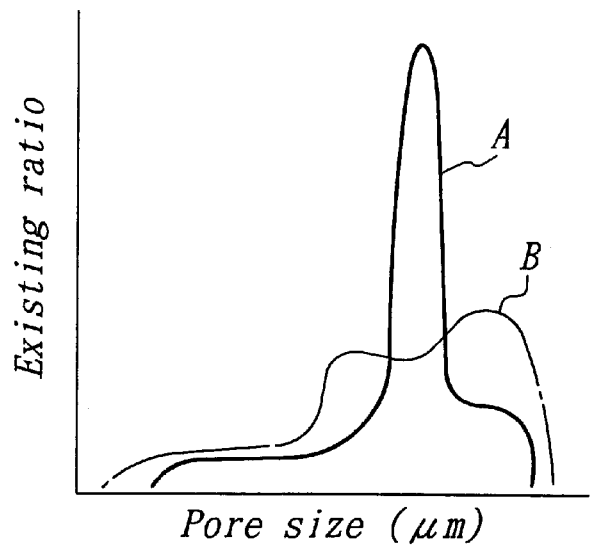
FIG. 11 is a graph showing a pore size distribution of a cell wall in the conventional cordierite filter and the SiC filter according to the invention.

In FIG. 11 is shown a pore size distribution in a cell wall in the conventional cordierite filter and the SiC honeycomb filter according to the invention, wherein a solid line A indicates the cell wall of the SiC filter and a dot-dash line B indicates the cell wall of the cordierite filter. As seen from FIG. 11, the cordierite filter has two peaks at lower side and higher side of pore size, while the SiC filter has a single sharp peak. This shows that the SiC filter has a structure having substantially the uniform pore size and the cordierite filter has a structure having ununiform pore size distribution.

Figure 12A:
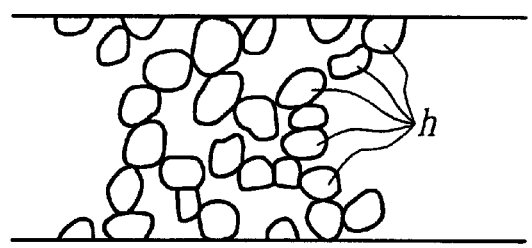
FIG. 12a is a diagrammatic view of an inner structure of a cell wall in the SiC filter according to the invention.
Figure 12B:
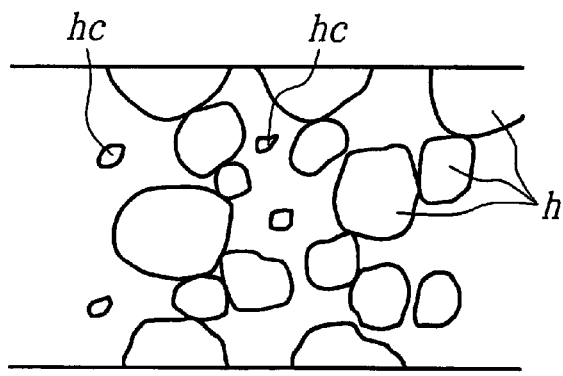
FIG. 12b is a diagrammatic view of an inner structure of a cell wall in the conventional cordierite filter.

An inner structure of the cell wall in the SiC filter is shown in FIG. 12a, while an inner structure of the cell wall in the conventional cordierite filter is shown in FIG. 12b. As seen from FIG. 12a, pores h having substantially a constant pore size are connected to each other in the cell wall of the SiC filter, which are easy to pass a fluid such as an exhaust gas or the like. In the cordierite filter, as seen from FIG. 12b, pores h having various pore sizes are connected to each other in the cell wall, while closed pores hc having a smaller pore size are independently existent therein.

In case of the conventional checkered honeycomb cordierite filter, the interconnected pores in the cell wall contribute to decrease $\Delta P3$ in the aforementioned equation (1) at a state that the particulates are not yet deposited on the cell wall, which makes the initial pressure loss $\Delta Pi$ small at any flow rates Va. However, as the exhaust gas gradually passes through the filter, the particulates included in the exhaust gas are concentrically deposited on surface portions of the cell wall existing pores having a large pore size located near to the surface of the cell wall to cover such surface portions, and hence the pass of the exhaust gas through portions of such large-size pores covered with the particulate is obstructed to rapidly increase the pressure loss though the pores having relatively small pore size located near to the surface of the cell wall contribute to decrease the pressure loss.

On the other hand, in the checkered SiC honeycomb filter according to the invention having the same cell structure as in the cordierite filter, the initial pressure loss ΔPi is equal to that of the cordierite filter. However, since the pore size of the interconnected pores in the cell wall is substantially constant and the pore size distribution is uniform, when the exhaust gas is passed through the filter, the particulates included in the exhaust gas are equally deposited over the full surface of the cell wall, so that there is caused no rapid increase of the pressure loss as in the cordierite filter. And also, the value of the pressure loss becomes lower than that of the cordierite filter.

Figure 13:
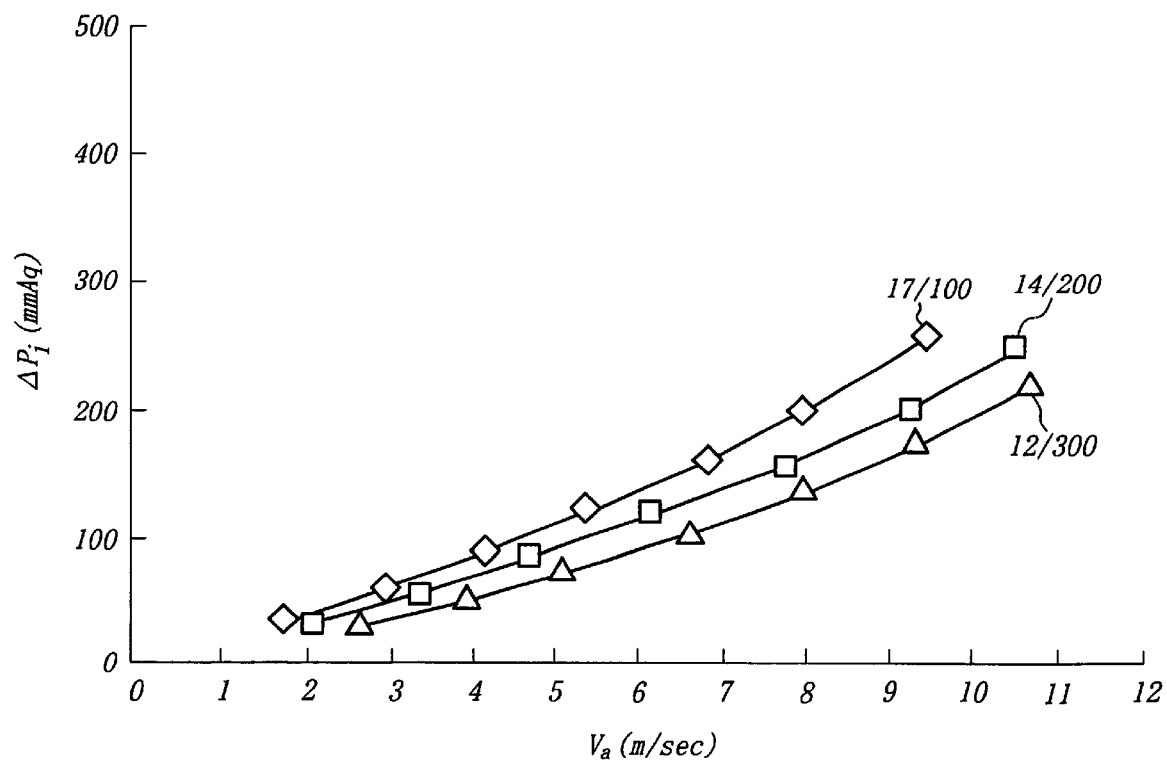
FIG. 13 is a graph showing a relation between initial pressure loss and air flow rate in the checkered honeycomb SiC filter.

In FIG. 13 is shown a relation between initial pressure loss ΔPi (mmAq) and air flow rate Va (m/sec) at 20° C. in the checkered SiC honeycomb filter having a side of 33 mm and a length of 150 mm and a cell structure Cs (mil/cpi) of 17/100, 14/200 or 12/300. As seen from FIG. 13, the initial pressure loss is proportional to the air flow rate supplied to the filter. And also, the value of the initial pressure loss lowers as the cell number becomes large and the thickness of the cell wall becomes thin. In other words, the pass of air through the filter becomes more easy as the value of the initial pressure loss becomes lower. This is true in the results shown in FIG. 10. That is, the change of pressure loss becomes small as the value of the initial pressure loss becomes lower.

Figure 14:
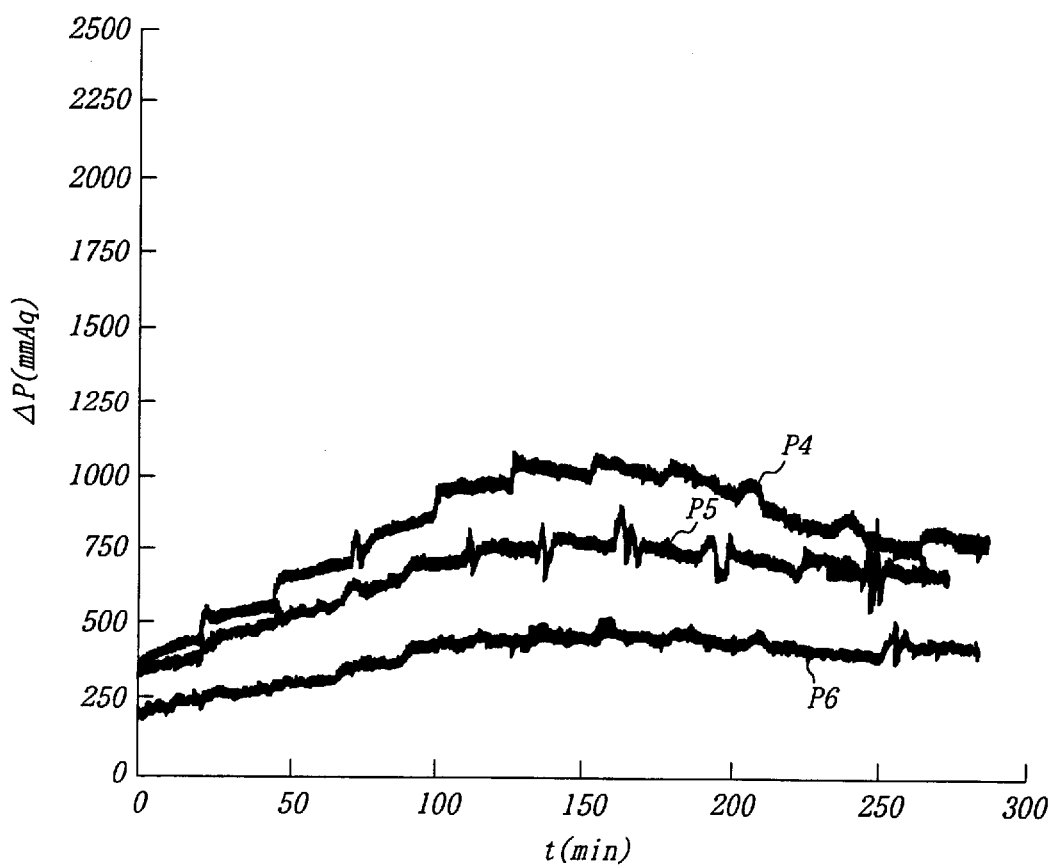
FIG. 14 is a graph showing an influence of a diameter φ of the checkered SiC honeycomb filter upon pressure loss ΔP when using a gas oil containing a fuel additive.

In FIG. 14 is shown an influence of a diameter φ of a filter in the checkered SiC honeycomb filter upon the pressure loss ΔP when the particulate included in the exhaust gas is caught by the filter having a cell structure Cs (mil/cpi) of 14/200 with the lapse of time, wherein a curve P4 is a case that the filter diameter φ is 144 mm, and a curve P5 is a case that the filter diameter 100 is 165 mm, and a curve P6 is a case that the filter diameter 100 is 190 mm. As seen from FIG. 14, the pressure loss and the change thereof can be made small as the volume of the filter becomes larger.

As previously mentioned, the total volume of the filter is determined by the engine swept volume of the internal combustion engine used. In the invention, it is favorable that the total volume of the filter is set to ¼–2 times the engine swept volume of the internal combustion engine when cell structure of the filter is the same. When the total volume is less than ¼ times the swept engine volume, the pressure loss ΔP becomes too large as seen from FIG. 14 to considerably degrade the fuel consumption, while when the total volume exceeds 2 times the swept engine volume, the pressure loss can be made small, but the total volume of the exhaust gas cleaning device inclusive of the filter is too large and hence such a device can not be disposed in the exhaust emission path for the internal combustion engine.

Figure 15:
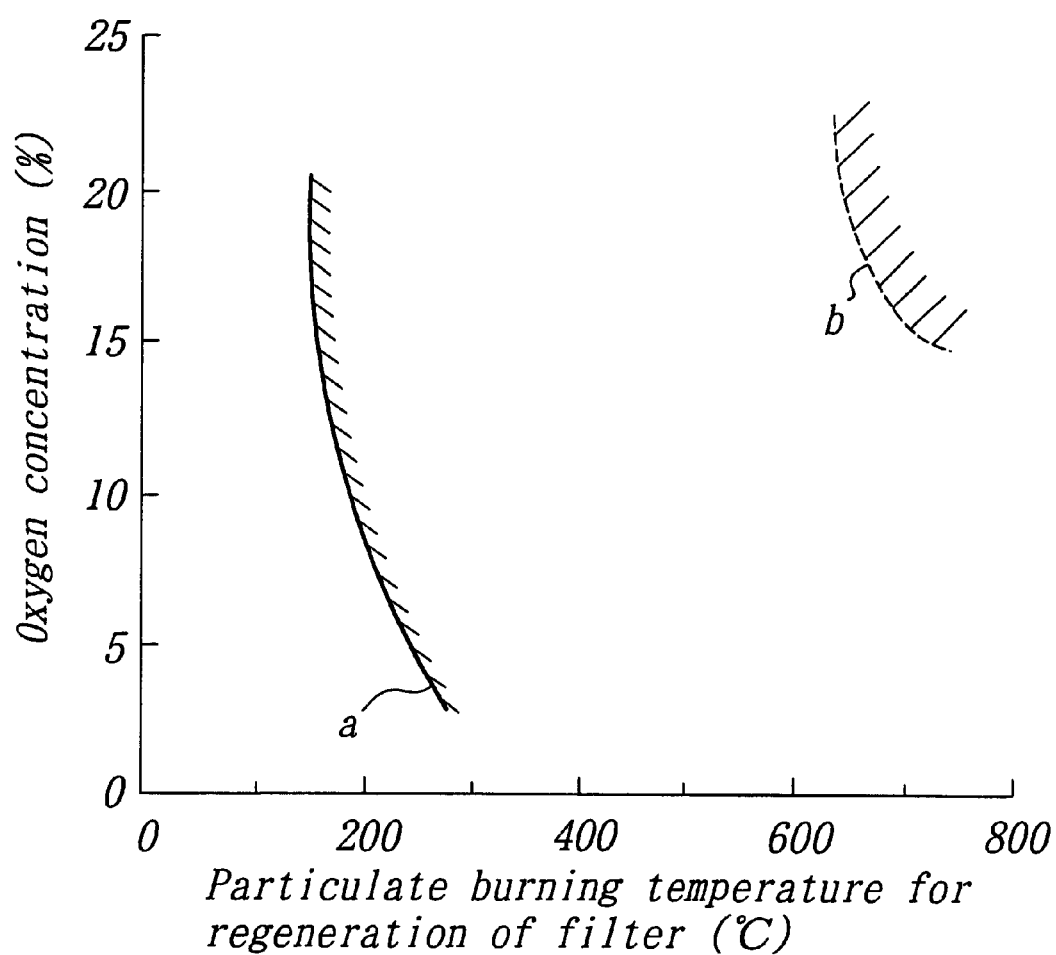
FIG. 15 is a graph showing a relation between oxygen concentration in exhaust gas and temperature burning particulate for attaining a regeneration ratio of not less than 80% in the exhaust gas cleaning filter when the invention is compared with the conventional technique.

In FIG. 15 is shown a relation between oxygen concentration (%) in an exhaust gas and a particulate burning temperature (°C.) for attaining a regeneration ratio of not less than 80% (shown by a shadowed region) in the checkered honeycomb SiC filter after a given amount (10 g/L) of the particulate is caught by the filter. In this case, the SiC filter has a cell structure Cs (mil/cpi) of 14/200 and a regeneration gas having various oxygen concentrations at a temperature of 150° C. as a substitute for the exhaust gas is introduced into the filter at a flow rate Va of 2.5 m/sec. Moreover, the term "regeneration ratio" used herein means a percentage of filter weight after the introduction of the regeneration gas to filter weight before the introduction of the regeneration gas.

In FIG. 15, a shadowed region of a curve a is a region for attaining the regeneration ratio of not less than 80% when particulates deposited on the SiC filer from a diesel engine using a gas oil containing a fuel additive is burnt by the glow plug 34, while a shadowed region of a curve b is a region for attaining the regeneration ratio of not less than 80% when particulates deposited on the SiC filer from a diesel engine using only a gas oil containing no fuel additive is burnt by a heater.

As seen from the curve b in FIG. 15, when using only the gas oil as in the conventional technique, in order to attain the regeneration ratio of not less than 80%, the oxygen concentration in the exhaust gas is required to be not less than at least 15% and also it is required to heat the filter above about 650° C. by the heater for burning the particulate. On the contrary, as seen from the curve a in FIG. 15, in order to attain the regeneration ratio of not less than 80% according to the invention, the gas oil containing the fuel additive is used in the diesel engine, so that the particulate burning temperature is sufficient to be at least 150° C., and also even when the oxygen concentration in the exhaust gas is as low as 3%, it is enough to heat the filter at a temperature considerably lower than that of the curve b by the heater or the glow plug.

According to the embodiment shown in FIG. 4, the usual size of the filter can be utilized as it is without increasing the volume of the filter, so that the regeneration system for the exhaust gas cleaning device of the illustrated embodiment is effective to a vehicle having a large displacement such as truck and bus having a displacement of 12 liter. Although the illustrated embodiment is described with respect to the branched structure of three regeneration units, the invention may take a branched structure wherein two regeneration units are arranged side by side in the exhaust emission path 11 as shown in FIG. 16a or a structure of arranging a single regeneration unit in the exhaust emission path 11 as shown in FIG. 16b.

Figure 16A:
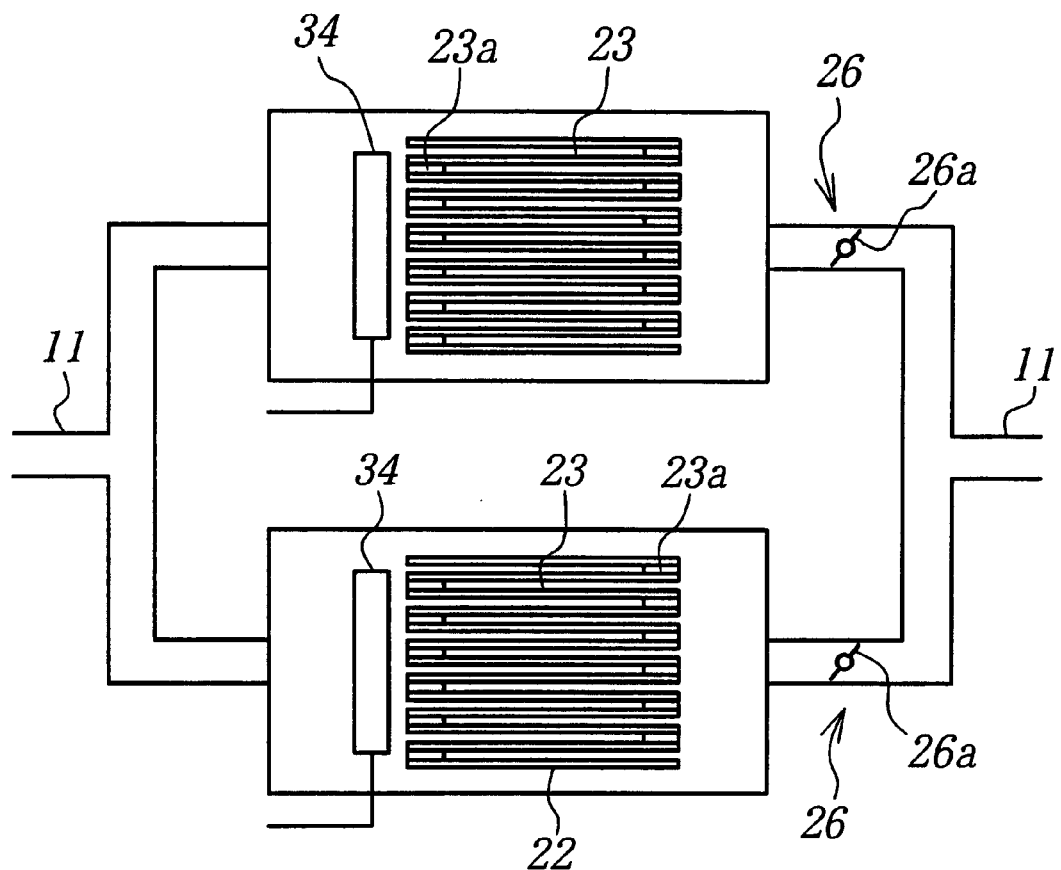
FIGS. 16a and 16b are diagrammatic views illustrating another embodiments of the regeneration system according to the invention.

The two branched structure shown in FIG. 16a is used in a truck having a displacement of, for example, 7 liter, wherein the control of the two regeneration units can be carried out by the same method as in the three-branched structure shown in FIG. 4. That is, the flow control valve 26 and the glow plug 34 in each of the two regeneration units are controlled by a command from the control unit (not shown), whereby the exhaust gas is cleaned by the filter in one of the regeneration units at a non-worked state of a valve body 26a in the flow control valve 26, while the filter of the other regeneration unit at a worked state of a valve body 26a of the flow control valve 26 is regenerated by heating such a filter through the glow plug 34.

Figure 16B:
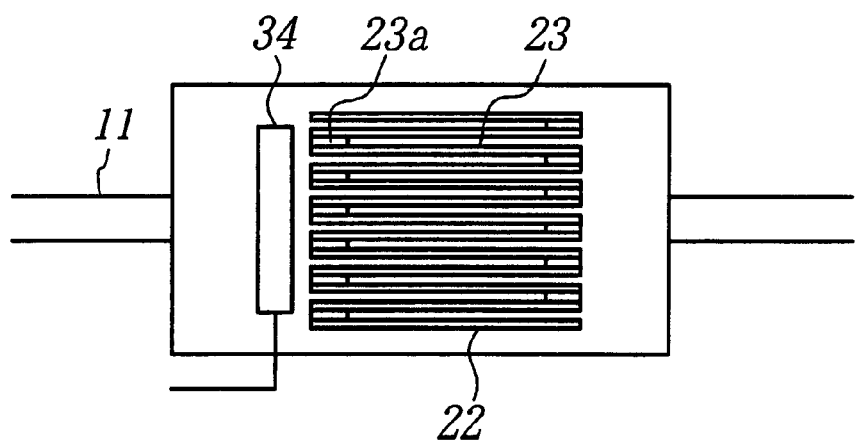

The single structure shown in FIG. 16b is used in a passenger car having a displacement of, for example, 3 liter, wherein the control of the regeneration unit is carried out by switching on or off only the glow plug 34 without using the flow control valve because the purification of the exhaust gas and the regeneration of the filter are simultaneously carried out.

What is claimed is:

1. A regeneration system for an exhaust gas cleaning device disposed in an exhaust emission path of an internal combustion engine comprising an exhaust gas cleaning honeycomb filter for collecting particulates included in the exhaust gas and a heating means for the exhaust gas cleaning honeycomb filter, said filter is a checked honeycomb filter made of a porous silicon carbide sintered body and having a cell structure that a cell number per square inch is not less than 100 cells and a thickness of a cell wall is not more than 0.43 mm, wherein said internal combustion engine uses a gas oil containing a fuel additive for controlling an amount of particulates produced in the exhaust gas, and said heating means is selected from a heater and a glow plug and disposed in front of an upstream end face of the filter to heat the exhaust gas and to obtain a particulate burning temperature of at least 150° C. sufficient for attaining a filter regeneration ratio of not less than 80%.

2. A regeneration system according to claim 1, wherein the glow plug is a ceramic glow plug.

3. A regeneration system according to claim 1, wherein the filter has a total volume corresponding to ¼–2 times an engine swept volume of the internal combustion engine.

4. A regeneration system according to claim 1, wherein the heater is a spiral-shaped resistance heating heater.

* * * * *